United States Patent
Klaren

[11] Patent Number: 6,109,342
[45] Date of Patent: Aug. 29, 2000

[54] APPARATUS FOR CARRYING OUT A PHYSICAL AND/OR CHEMICAL PROCESS, SUCH AS A HEAT EXCHANGER

[75] Inventor: Dick Gerrit Klaren, Hillegom, Netherlands

[73] Assignee: Klarex Beheer B.V., Nijerk, Netherlands

[21] Appl. No.: 09/038,330

[22] Filed: Mar. 11, 1998

[30] Foreign Application Priority Data

Mar. 12, 1997 [NL] Netherlands ............................ 1005514

[51] Int. Cl.[7] ................................................... F28D 15/00
[52] U.S. Cl. .................... 165/104.16; 110/245; 422/145; 422/147; 165/119
[58] Field of Search ................................ 165/104.16, 108, 165/119; 110/245; 422/145, 147

[56] References Cited

U.S. PATENT DOCUMENTS

| | | |
|---|---|---|
| 4,246,231 | 1/1981 | Figler et al. . |
| 4,289,729 | 9/1981 | Meyers et al. . |
| 4,292,023 | 9/1981 | De Feo et al. . |
| 4,378,744 | 4/1983 | DeFoe et al. . |
| 4,398,594 | 8/1983 | Klaren . |
| 4,426,958 | 1/1984 | Hosek et al. . |
| 4,554,963 | 11/1985 | Goodwin et al. . |
| 4,615,382 | 10/1986 | Klaren . |
| 4,672,918 | 6/1987 | Engstrom et al. . |
| 4,716,856 | 1/1988 | Beisswenger et al. . |
| 4,781,574 | 11/1988 | Taylor . |
| 4,955,295 | 9/1990 | Abdulally . |
| 5,033,413 | 7/1991 | Zenz et al. . |
| 5,141,708 | 8/1992 | Campbell, Jr. et al. . |
| 5,159,886 | 11/1992 | Schaub et al. . |
| 5,205,350 | 4/1993 | Hirsch et al. . |
| 5,218,932 | 6/1993 | Abdulally . |
| 5,308,585 | 5/1994 | Stroder et al. . |
| 5,314,611 | 5/1994 | Cetinkay . |
| 5,343,830 | 9/1994 | Alexander et al. . |
| 5,526,775 | 6/1996 | Hyppänen . |
| 5,601,039 | 2/1997 | Hyppänen . |
| 5,676,201 | 10/1997 | Klaren ................................ 165/104.16 |
| 5,709,884 | 1/1998 | Klaren . |

FOREIGN PATENT DOCUMENTS

| | | |
|---|---|---|
| 65 332 | 11/1982 | European Pat. Off. . |
| 278 262 | 8/1988 | European Pat. Off. . |
| 413 611 | 2/1991 | European Pat. Off. . |
| 1350734 | 12/1963 | France . |
| 21 52 401 | 4/1972 | Germany . |
| 34 32 864 | 3/1986 | Germany . |
| 2 087 534 | 5/1982 | United Kingdom . |
| WO 94/24507 | 10/1994 | WIPO . |

*Primary Examiner*—Christopher Atkinson
*Attorney, Agent, or Firm*—Merchant & Gould P.C.

[57] ABSTRACT

Heat exchanger, consisting of a reservoir, having upwardly directed tubes that are flowed through by a liquid to be heated and by fluidized bed particles for cleaning the tubes internally. Connected to the reservoir is an external downcomer (2) for receiving fluidized bed particles coming from the top box (21) of the reservoir and to be conveyed again to the bottom box (25) of the reservoir. Provided in the downcomer (2) is an inner tube (1) of smaller diameter, which is open at its bottom end (5) and provided, directly below the closed top end (9), with openings (8) for effecting a circulation flow in the downcomer (2).

4 Claims, 3 Drawing Sheets

APPARATUS FOR CARRYING OUT A PHYSICAL AND/OR CHEMICAL PROCESS, SUCH AS A HEAT EXCHANGER

This invention relates to an apparatus for carrying out a physical and/or chemical process, such as a heat exchanger, comprising a reservoir provided with upwardly directed tubes accommodated, at top and bottom ends thereof, in tube plates, the tubes being in open communication with a top box and a bottom box, at least one distribution plate being arranged in the bottom box for supporting a fluidized bed of granular material maintainable in a quasi-stationary, fluidized condition by a medium to be treated or heated which is supplied via the bottom box and which flows through the tubes, the apparatus further comprising means for feeding fluidized bed particles back from the top box, in the form of a downcomer arranged outside the reservoir and connected, at the top end thereof, to the top box by a separating device, the bottom end of the downcomer being communicable, through switching on and off, with the bottom box of the reservoir.

Such apparatus is known from EP-B-0.694.152 (FIG. 1). In Dutch patent application 1005517, copending with the present application, a modified construction for the bottom end of the downcomer according to FIG. 1 of EP-B-0.694.152 has already been proposed for improving the fluidized bed particles-circulator. The thus modified external downcomer forms an important component for the transport of the fluidized bed particles from the separator to the inlet box. For a specific, desired process control and inter alia depending on an appropriate choice of the diameter of the downcomer, the lower part of the downcomer contains a packed bed of particles, which bed, at the bottom side thereof, is broken down by the feed of flowing medium, optionally supported by the action of vibrators on the packed bed. The upper part of the downcomer is filled with a swarm of downwardly falling particles whose fall velocity depends on the size and form of the particles, the density of the material of the particles and the flowing medium, the viscosity thereof and the volume percentage of flowing medium of the swarm of solid particles relative to the volume of the downcomer without particles (porosity). If the feed of fluidized bed particles from the swarm is equal to the discharge of these particles from the packed bed to the inlet box, a position of equilibrium is created wherein the separation between the falling swarm of fluidized bed particles and the packed bed remains situated at a constant height in the downcomer. The pressure resulting from the total height of the packed bed and the remaining height of the downcomer in which the swarm of falling fluidized bed particles is located, determines the floating force which, in combination with the feed of flowing medium at the bottom end of the downcomer, is responsible for the amount of fluidized bed particles fed to the inlet box per unit of time. If a flowing medium of a different (higher) viscosity is selected, the fall velocity of the swarm of fluidized bed particles in the upper part of the downcomer will decrease, and the packed bed of particles will not be replenished sufficiently quickly, which will bring about a decrease of the height of the packed bed and, accordingly, of the total pressure of the packed bed in combination with the pressure caused by the falling swarm of particles in the remaining part of the downcomer. This decreasing pressure brings about a decreasing floating force and, as a consequence, considerably less transport of the fluidized bed particles from the lower part of the downcomer to the inlet box. More vibrator action and the feed of more flowing medium will hardly enable an increase of the transport of particles from the downcomer to the inlet box, either, and at a given moment, as a consequence of too little pressure of the particles present in the downcomer, the flowing medium fed to the downcomer will no longer flow from the lower part of the downcomer to the inlet box, but flow via the downcomer directly to the separator. In that case, the downcomer 'breaks down' or passes flowing medium in the undesired direction, as a result of which the feed of fluidized bed particles from the separator to the downcomer is blocked completely and these particles will accumulate in the separator. The separation between flowing medium and solid particles in the separator is obstructed and fluidized bed particles are discharged together with the flowing medium. Of course, the cleaning action of the fluidized bed particles in the heat exchanger tubes decreases as well, because no particles are fed anymore to the inlet box and, accordingly, to the tubes.

The above-described problem could be prevented by increasing the diameter of the downcomer, so that, in spite of the slight fall velocity of the fluidized bed particles in the downcomer resulting from, for instance, the increased viscosity of the flowing medium, sufficient particles are nevertheless fed to the packed bed in the downcomer to guarantee, when the operation of the heat exchanger is optimal, a constant and sufficiently high level of the packed bed in the downcomer. However, this is an expensive solution, because not only more material for the downcomer is needed, but also, because of the larger diameter of the downcomer, much more filling of fluidized bed particles, as the requirement to the effect that for an optimal operation, a specific height of the packed bed of fluidized bed particles is necessary for preventing the downcomer from breaking down, must be met. After all, only that height determines the pressure at the bottom of the downcomer and, accordingly, the floating force for transport to the inlet box.

The object of the invention is to overcome the drawbacks mentioned.

According to the invention, this object is realized by providing in the downcomer of an apparatus of the above-described type, means for effecting a natural circulation flow in that downcomer. These means preferably consist of an inner tube of smaller diameter which is closed at its top end and open at its bottom end, and which, at a short distance below the top end, is provided with outflow openings, located at the level of the funnel-shaped bottom end of the separator.

Further elaborated variants are described in subclaim 3 and the following subclaims.

In this manner, a circulation flow of flowing medium is created in the ring-shaped space or annulus between the downcomer and the inner tube.

A partial flow of flowing medium, loaded with the fluidized bed particles separated by the separator, is drawn from the bottom part of the separator, and these particles are conveyed downwards through the annulus of the downcomer in the direction of the packed bed at a velocity which is considerably higher than usual, after which the partial flow of flowing medium with only a slight load of solid particles flows upwards again via the open bottom end or holes in the wall of the bottom end of the inner tube, into the lower part of the separator, to subsequently flow down again with a new load of separated fluidized bed particles.

Hereinafter, embodiments of the apparatus according to the invention will be further explained with reference to the accompanying drawings. In these drawings.

Figure 1:
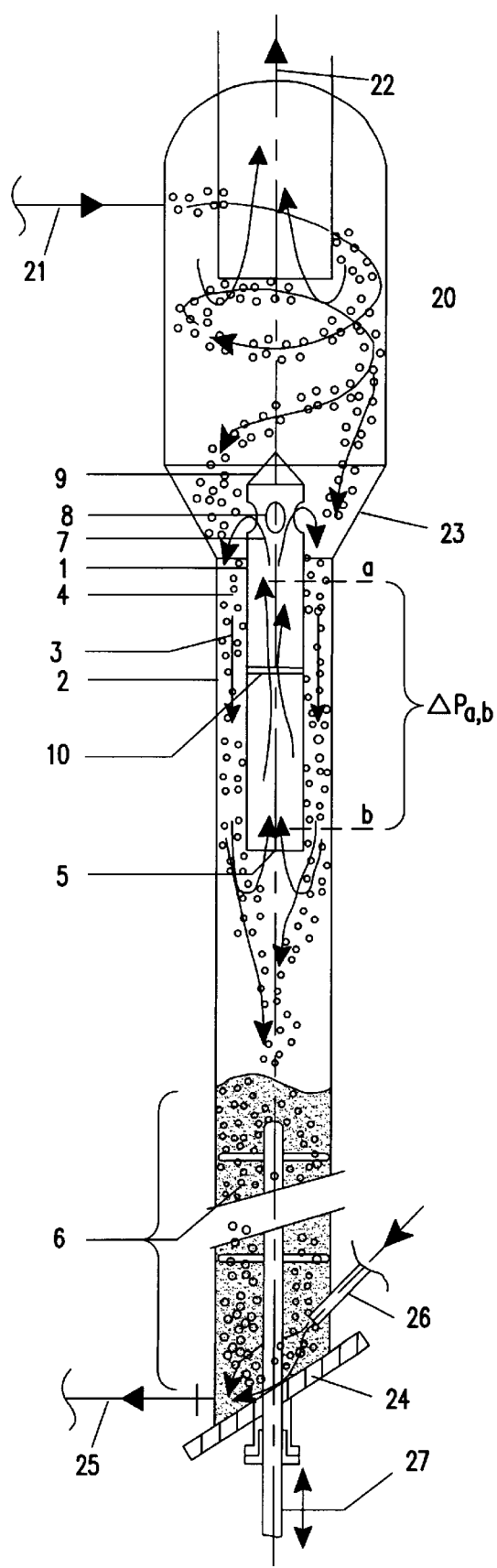
FIG. 1 shows the downcomer of an apparatus according to EP-B-0.694.152 (FIG. 1), provided with means for effecting a circulation flow.

The downcomer shown in FIG. 1 substantially consists of a separator or separating device 20, to which a line 21 is connected for connecting the separator 20 to the top box of the reservoir 28 (see FIG. 3) of the heat exchanger, and further a conduit 22 for discharging flowing medium from the reservoir 20. At its bottom end, the downcomer 2 proper connects to the separator 20, via an inlet funnel 23. At its bottom end, the downcomer 2 is closed by an inclined closing plate 24 for supporting the packed bed 6 of fluidized bed particles. Directly above the closing plate 24, a line 25 is connected to the downcomer 2 for connecting the downcomer 2 to the bottom box of the heat exchanger reservoir. Extending into the packed bed 6 is a line 26 for feeding flowing medium thereto. Extending through the plate 24 is a bar 27, connected to a vibrator 33 (see FIG. 3).

Within the downcomer 2, an inner tube 1 is provided whose closed top end 9 is positioned at location of the inlet funnel 23. In this manner, a ring-shaped space or annulus 3 is formed between the walls of the downcomer 2 and the inner tube 1. The inner tube 1 is open at its bottom end to form an inflow opening 5, while directly below the closing cover 9, a number of openings 8 are provided in the wall of the inner tube 1 to form an outflow opening 7.

During operation, a natural circulation flow will occur in the path formed by the annulus 3, the inflow opening 5, the inner tube 1 and the outflow opening 7, in that initially, the pressure difference $\Delta P_{a,b}$ over the length of the downcomer 2 between the points a and b is greater in respect of the flow through the annulus 3 than in respect of the flow through the inner tube 1. This is caused by the fact that the annulus 3 is loaded with a volume fraction of fluidized bed particles 4 of, for instance, 20%, while in the upwardly directed flow in the inner tube 1, particles 4 will hardly be present. At a given moment, a constant circulation flow is achieved in that the floating force resulting from the weight of the particles 4 in the annulus flow is equal to the total loss of resistance pressure of the circulation of the flowing medium over annulus 3 and inner tube 1. As they leave the annulus 3, the fluidized bed particles 4 are conveyed in the direction of the packed bed 6 at a considerable downwardly directed initial velocity. Because of this high initial velocity, an averagely higher swarming velocity is realized directly above the packed bed 6 and based on the inner diameter of the downcomer 2 than without the use of the inner tube 1.

The lowest part of the downcomer 1—the inflow opening 5—can be located above the packed bed 6 in the downcomer 2 and as such, the flow approaching the inner tube 1 undergoes little obstruction and, in general, a proper separation of flowing medium and fluidized bed particles 4 can be effected, as a result of which, in general, only few particles 4 will move along upwards with the flow in the inner tube 1. In the highest part of the inner tube, the outflow opening 7 is covered by a cover 9 to prevent fluidized bed particles 4 from the separator 20 from falling not only into the annulus 3, but also into the inner tube 1, which has an adverse effect on the pressure difference $\Delta P_{a,b}$ for the circulation. The circulation can be influenced by changing the flow resistance of the inner tube 1, for instance by selecting a small internal diameter, rendering the outflow openings 8 smaller, or providing the inner tube 1 with one or more throttling plates 10. Sometimes, because of varying operating conditions, the level of the packed bed is subject to change of place. For instance, in the case of more circulation of fluidized bed particles 4 through the tubes of the heat exchanger for increasing the cleaning action, the level of the packed bed 6 will drop. Of course, the reverse may also be the case. This means that there is the possibility that the inflow opening 5 of the inner tube 1 extends into the packed bed 6, as a consequence of which a proper circulation of the flowing medium is no longer possible.

Figure 2:
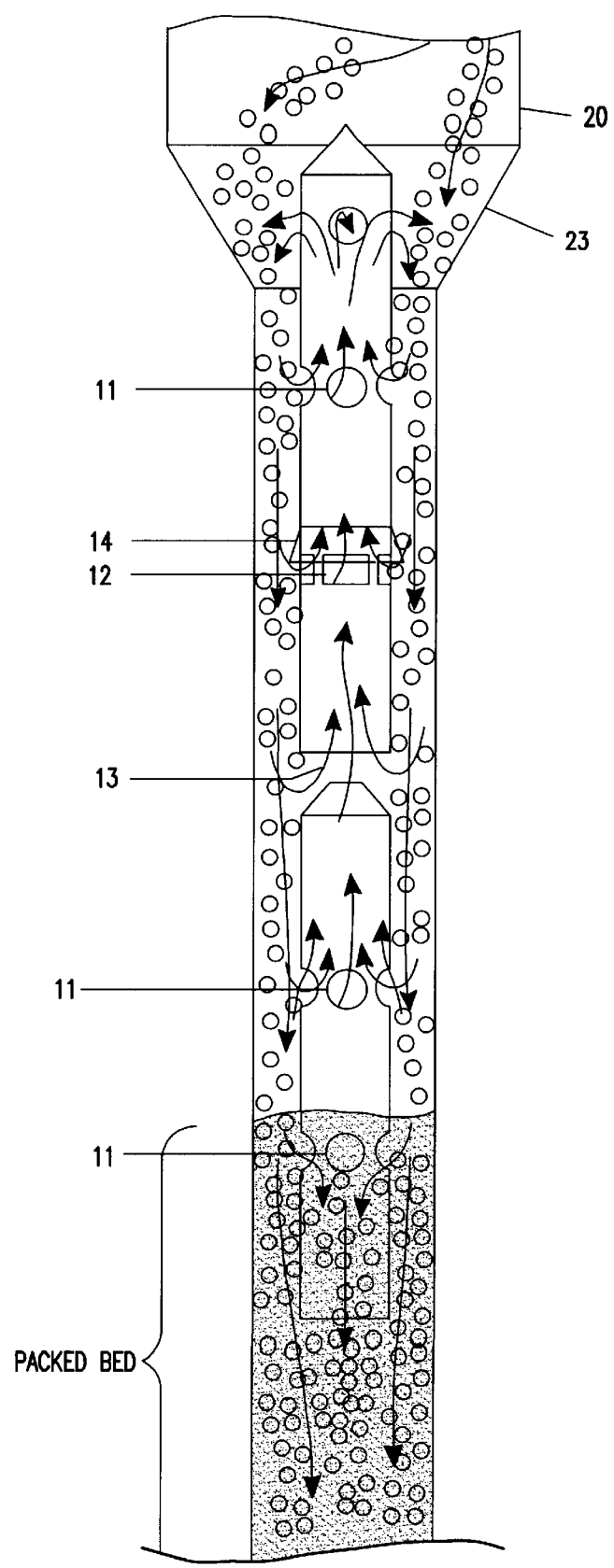
FIG. 2 shows a structural variant of the downcomer according to FIG. 1.

FIG. 2 provides a solution to this problem. The wall of the inner tube 1 is provided with openings 11, 12, through which circulation of flowing medium remains possible, in spite of the fact that the inner tube 1 extends into the packed bed 6. These openings may have the form of holes 11 or slots 12. It is also possible to realize an opening 13 by constructing the inner tube 1 in two separate parts. Of course, a combination of holes, slots and one or more interruptions of the inner tube 1 is possible as well.

It is recommendable to provide the top sides of the openings 11, 12 in the inner tube 1 with, for instance, an inclined edge 14, which renders the transport of fluidized bed particles 4 through these openings more difficult. Also, holes or slots in the inner tube 1 may be deformed so that the same effect is realized as in the case of an inclined edge 14 above the openings, for instance by bending the top edges of the holes or slots outwards in the direction of the annulus 3 and/or depressing the bottom edges of these holes or slots towards the center of the inner tube 1.

Figure 3:
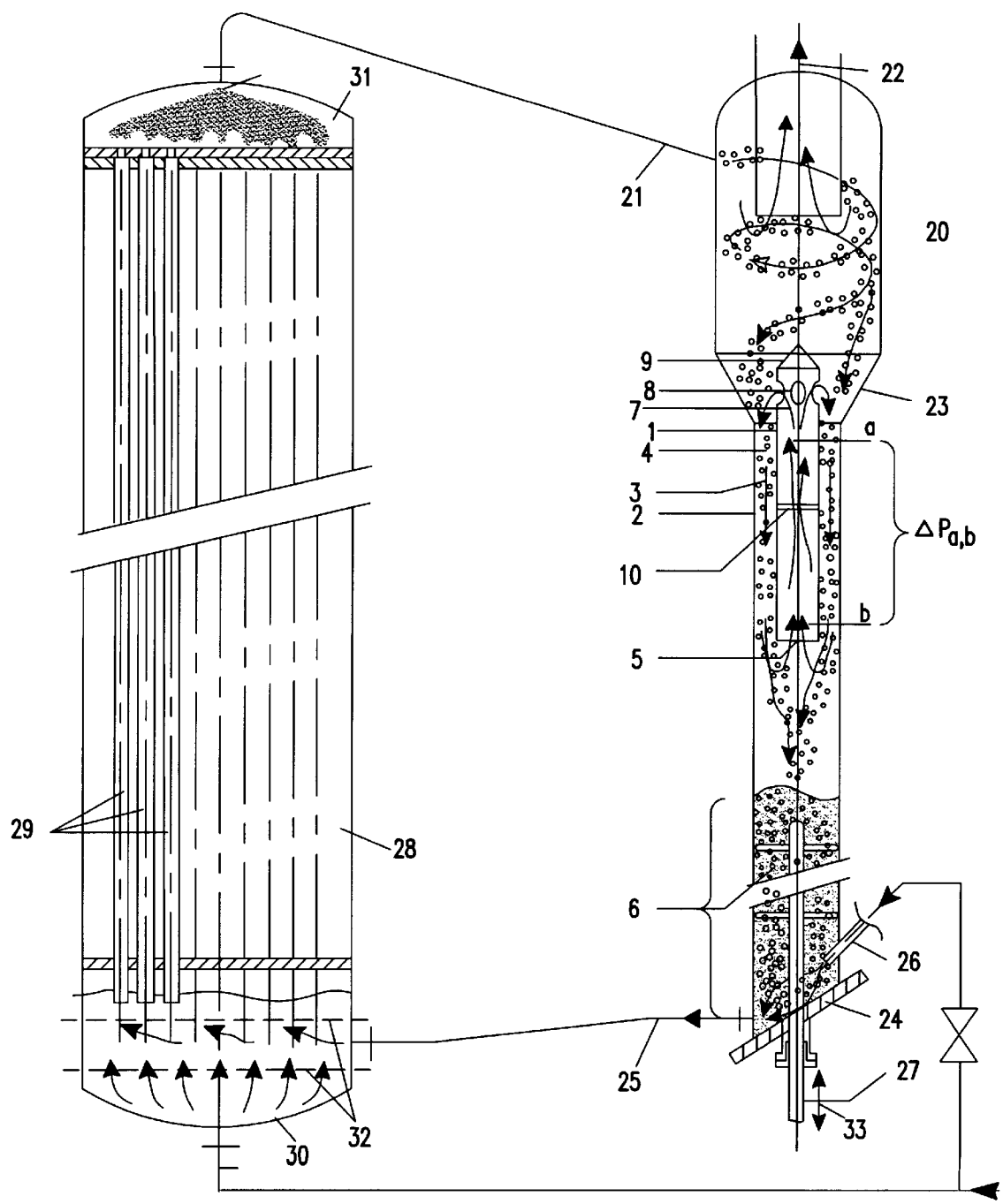
FIG. 3 shows a first embodiment of the apparatus.

The provision of several openings in the wall of the inner tube, distributed over the length thereof at an acceptable internal diameter to prevent blockage by the packed bed 6, prevents the occurrence of unduly high velocities in the annulus 3 and thus reduces wear. This also offers the possibility of varying the level of the packed bed 6 in the downcomer 2 without the natural circulation being obstructed, the final effect of which is a sufficient feed of fluidized bed particles 4 from the falling swarm. FIG. 3 provides an apparatus for carrying out a physical and/or chemical process, such as a heat exchanger, consisting of a reservoir 28 provided with upwardly directed tubes 29 accommodated, at top and bottom ends thereof, in tube plates, the tubes being in open communication with a top box 31 and a bottom box 30, at least one distribution plate 32 being arranged in the bottom box 30 for supporting a fluidized bed of granular material maintainable in a quasi-stationary, fluidized condition by a medium to be treated or heated which is supplied via the bottom box 30 and which flows through the tubes 29, the apparatus further comprising means for feeding fluidized bed particles back from the top box 31, in the form of a downcomer 2 arranged outside the reservoir 28 and connected, at the top end thereof, to the top box 31 by a separating device 20, the bottom end of the downcomer 2 being communicable, through switching on and off, with the bottom box 30 of the reservoir 28.

What is claimed is:

1. An apparatus for carrying out a process, comprising:
   a reservoir provided with upwardly directed tubes accommodated, at top and bottom ends thereof, in tube plates, the tubes being in open communication with a top box and a bottom box;
   at least one distribution plate being arranged in the bottom box for supporting a fluidized bed of granular material maintainable in a quasi-stationary, fluidized condition by a medium to be treated or heated which is supplied via the bottom box and which flows through the tubes; and
   means for feeding fluidized bed particles back from the top box, in a form of a downcomer arranged outside the reservoir and connected, at the top end thereof, to the top box by a separating device, the downcomer having a separating device with a funnel-shaped bottom and, the bottom end of the downcomer being communicable, through switching on and off, with the bottom box of the reservoir, the downcomer being provided with means for effecting a natural circulation flow in the downcomer, wherein the means for effecting a natural circulation flow includes an inner tube having a smaller diameter and closed at a top end, the inner tube being open at a bottom end and provided, at a short distance below the top end, with outflow openings located at a level of the funnel-shaped bottom end of the separating device.

2. An apparatus according to claim 1, wherein the inner tube comprises at least one throttling plate.

3. An apparatus according to claim 1, wherein a wall of the inner tube between the open bottom end and the outflow openings adjacent the top end, is provided with additional openings.

4. An apparatus according to claim 3, wherein the additional openings have top sides provided with an outwardly inclined edge and/or have bottom sides provided with an inwardly inclined edge.

* * * * *